Sept. 2, 1930.  R. F. WILLIAMS  1,774,623
SAFETY CLAMP
Filed Sept. 28, 1927
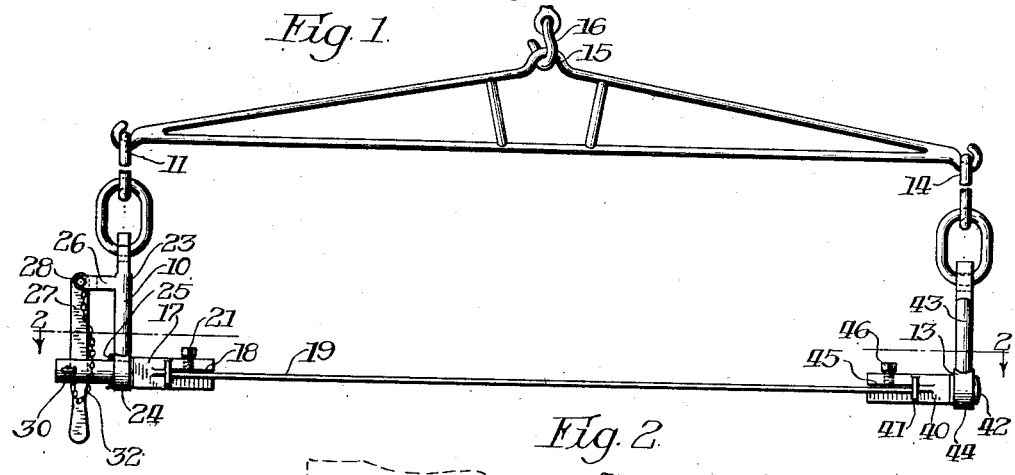
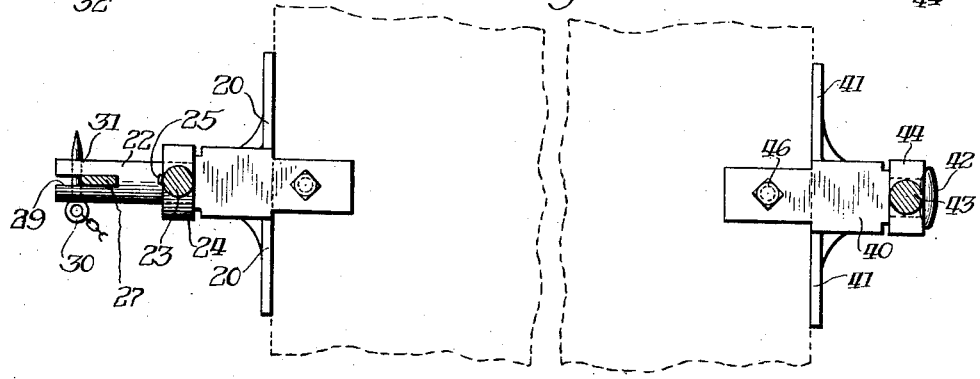
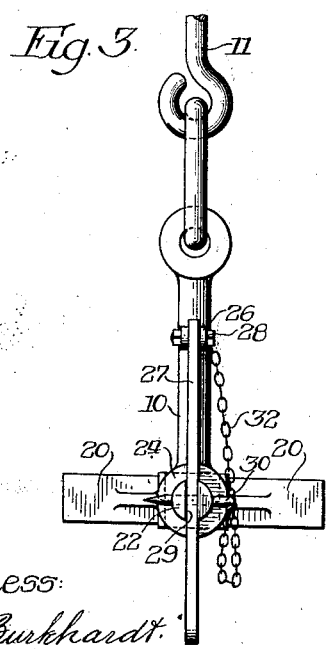
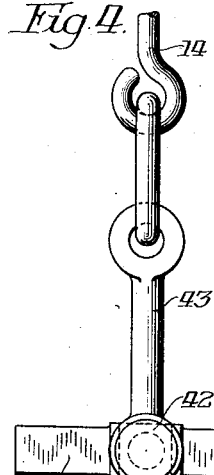
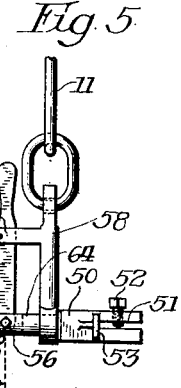
Witness:
R. Burkhardt
Inventor:
Richard F. Williams,
By D. Anthony Nsina  Atty Patented Sept. 2, 1930

1,774,623

UNITED STATES PATENT OFFICE

RICHARD F. WILLIAMS, OF EVELETH, MINNESOTA

SAFETY CLAMP

Application filed September 28, 1927. Serial No. 222,544.

This invention pertains to safety clamps, and more particularly to clamps to be used in supporting, handling and positioning material otherwise difficult to manipulate.

Difficulty has heretofore been encountered in handling large, heavy and bulky material. This is especially noticeable in handling heavy plates in construction and in repair in steel mills, shipyards, etc. For instance, it may be oftentimes necessary in renewing plate liners on decks of the bodies of cars to lift out the old plate and to position the new plate in its place. In this particular case, the new plate must be first laid down in its place and the location of the holes marked on the under side thereof as by the introduction of a pencil or marker through the holes in the deck fastening means and then to remove the plate, turn the same upside down and drill the holes. It will be readily appreciated then that this large unwieldy plate must be revolved through an angle of at least 180° which formerly required comparatively complicated and expensive machinery, or if done with makeshift devices, was dangerous as no positive locking means were provided to prevent movement of the plate.

It is therefore an object of this invention to provide a device for more readily handling material or parts to be worked.

Another object is to provide a device which may be moved readily and locked in operating position.

Still another object is to provide a device for handling plates and the like, whereby the plate or the like may be readily moved to and secured in such a position that it may be easily operated on, without danger of the plate assuming dangerous or otherwise unworkable positions.

A further object is to provide a device for easily and positively handling material whereby said material may be securely placed in changed positions with no danger to the operator or other persons.

A still further object is to provide a safety clamp for manipulating material which is inexpensive to manufacture and maintain, is positive in operation, and will fulfill all requirements of service.

With these and various other objects in view, the invention may consist of certain novel features of construction and operation as will be more fully described and particularly pointed out in the specification, drawings and claims appended hereto.

In the drawings wherein like reference characters are used to designate like parts, Fig. 1 is an elevation showing a clamp assembly associated with a plate, said assembly being in locked position;

Fig. 2 is an enlarged fragmentary plan of Fig. 1 taken substantially in the plane as indicated by the line 2—2 of Fig. 1;

Fig. 3 is an enlarged end elevation of the locking clamp shown in Fig. 1;

Fig. 4 is an enlarged end elevation of the plain pivot clamp shown in Fig. 1; and Fig. 5 is a side elevation of a modification of the locking clamp.

The pivot clamp assembly consists essentially of a locking clamp 10 which may be fastened through suitable supporting chain links 11 to a trussed support 12 which may also support a plane pivot clamp 13 through suitable chain links 14 similar to the supporting links 11. It will of course be understood that the support 12 is provided with suitable fastening means 15 for the reception of the hook 16 of any suitable lifting mechanism such as a derrick, hoist or the like.

The locking clamp 10 consists of article securing means which may take the form of a notched body member 17 provided with slot or notch 18 for the reception of any material such as the plate 19. On either side of the notch shoulders or positioning members 20 are provided adapted to contact with the edge of the plate to hold the same in fixed position with reference to the clamp. Any suitable locking or fastening means such as the screw 21 may be provided in way of the notch to fasten the plate therein. A trunnion bearing 22 is provided integral with the body 17 and is adapted to be supported by a bar link 23 attached to chain links 11 and provided with a bearing 24, the bearing being adapted to have rotatable movement with respect to the trunnion but prevented from having longitudinal movement thereon by a suitable locking means such as the cotter pin 25. The bar link 23 is provided with a bifurcated lug 26 to which a locking member 27 is pivoted at 28, said member of which may be in the form of a handle adapted to have engagement with a slot 29 provided in the extended portion of the trunnion 22, it being noticed that the slot 29 is preferably at right angles to the slot 18 and the path of movement of the handle 27 is in the plane of the bar link 23.

A locking member 30 in the form of a pin may be provided for maintaining the handle 27 fixed in the slot 29, said pin being insertable in an aperture 31 provided in the bifurcated end of the trunnion 22, and secured to the assembly as by a chain 32 fixed to lug 26.

The plane pivot link 13 comprises a notched body portion 40 similar to the body portion 17 of the locking pivot clamp 10, said body portion also being provided with shoulders 41 similar to the shoulders 20. Instead, however, of having a prolonged trunnion such as at 21, a trunnion or bearing 42 is provided for the bearing 44 of the bar link 43, said trunnion being of sufficient length to provide a bearing and a fastening for the bar link. It is of course understood that the body member 40 is provided with a notch or slot 45 and fastening means 46 for fixedly cooperating with the plate 19.

Referring now more particularly to the modification shown in Fig. 5, the notched body member 50, as in the case of the member 17, is provided with a suitable notch 51, locking means 52 and shoulders 53. The trunnion bearing 54 is bifurcated and has a locking and operating handle 55 pivoted thereto at 56 for movement of at least 180° as indicated by the arrow 57. The bar link 58 supported from chain links 11 is provided with a bifurcated lug 59 suitably placed and adapted for the reception of the locking handle 55 and is provided with an aperture for the reception of the locking pin 60 which may be fastened to the device in any suitable manner such as by the chain 61.

In operation, referring particularly to the modification shown in Figs. 1 to 4 inclusive, it will be seen that it is only necessary to position the plate 19 preferably adjacent its center of gravity within the slots 18 and 45 of the respective pivot clamps, securing said plate by means of the locking means 21 and 46. With the locking lever 27 in released position, the plate may be revolved to a desired position where it is locked in that position by means of engagement between the locking lever 27 and the bifurcated part of the trunnion 22 where, it being understood that the lever may be locked in position by means of the pin 30. The plate may then be lifted and moved to any desired position by means of the truss member 12 and the derrick, etc., where it may be marked, removed and then it may be revolved to a new position (180° as shown) where it may be again locked.

In the modification shown in Fig. 5, lever 55 performs two functions, namely, that of locking the plate in a fixed position, such as by engagement of the lever with the lug 59 and the locking thereby by means of the pin 60, and also that of providing a means for turning the plate as will be understood. It will readily be appreciated that any grouping of the safety clamps may be used, i. e., either both clamps may be of the form shown in Fig. 3, or both may be as shown in Fig. 5, or it may be preferred to use either of these clamps in conjunction with that shown at 13.

It is, of course, to be understood that the invention is not to be limited to the exact modifications shown, as it will be apparent that other and various modifications will occur to those skilled in the art.

I claim:

1. In a lifting device, the combination of supports, a pair of spaced clamping members pivotally mounted for rotative movement thereon, each of said clamping members having spaced jaws for receiving and holding an article therebetween, a supporting member secured to each of said supports, one of said first named supports having means thereon for preventing relative movement between a supported article and said first named supports.

2. In a lifting device, the combination of supports, a pair of spaced clamping members pivotally mounted for movement thereon, each of said clamping members having spaced jaws for receiving and holding an article therebetween, outwardly extending members disposed on each of said clamping members adjacent said spaced jaws and adapted to cooperate with said article for positioning the same, a supporting member secured to each of said supports for spacing said supports, one of said first named supports having a locking member mounted thereon and engageable with one of said clamping members for preventing relative movement between a supported article and said first named supports.

3. In a device of the character described, the combination of article securing means, one of said means including a member having a trunnion bearing integral with said member, said trunnion member having a locking member thereon, a supporting member associated with said trunnion bearing, locking means associated with said supporting member and locking member, and means for maintaining said locking means in locked position.

4. In a device of the character described, the combination of article securing means, one of said means including a member having bearing means integral with the member, said bearing means having a notched extension thereon, a supporting member embracing said bearing means, locking means pivoted to said supporting member and engageable with said notched extension to selectively immovably lock said first named member, and means for maintaining said locking means in locked position.

5. In a device of the character described, the combination of a support having holding members secured thereon, one of said holding members including a trunnion, spaced jaws, and positioning members disposed adjacent said jaws and projecting outwardly therefrom, and a support pivoted to said trunnion, said support being disposed intermediate said first named support and said holding member.

6. In a device of the character described, the combination of a support having holding members secured thereon, one of said holding members including a trunnion, spaced jaws, and positioning members disposed adjacent said jaws and projecting outwardly therefrom, a support intermediate said first named support and said holding member and pivoted to said trunnion, and means adapted to cooperate with said holding member and said second named support to maintain the same in relative fixed positions.

Signed at Eveleth, Minn., this 20th day of September, 1927.

RICHARD F. WILLIAMS.